United States Patent [19]

van der Molen

[11] Patent Number: 4,820,471
[45] Date of Patent: Apr. 11, 1989

[54] PROCESS FOR THE PREPARATION OF BLOWN FILM

[75] Inventor: Theodorus J. van der Molen, Vijlen, Netherlands

[73] Assignee: Stamicarbon B.V., Geleen, Netherlands

[21] Appl. No.: 890,570

[22] Filed: Jul. 30, 1986

[30] Foreign Application Priority Data

Aug. 6, 1985 [NL] Netherlands .......................... 8502190

[51] Int. Cl.$^4$ .............................................. B29C 47/86
[52] U.S. Cl. .................................... 264/564; 264/173; 264/176.1; 425/72.1; 526/352.2
[58] Field of Search ............ 264/564, 560, 173, 176.1; 425/326.1, 72 R, 72.1; 428/518; 526/352.2

[56] References Cited

U.S. PATENT DOCUMENTS

| | | | |
|---|---|---|---|
| 3,754,067 | 8/1973 | St. Eve et al. | 264/237 |
| 3,920,782 | 11/1975 | Cogswell | 264/563 |
| 4,243,619 | 1/1981 | Fraser | 264/564 |
| 4,267,146 | 5/1981 | Kurtz et al. | 264/564 |
| 4,282,177 | 8/1981 | Kurtz et al. | 264/564 |
| 4,330,501 | 5/1982 | Jones et al. | 425/72 R |
| 4,348,349 | 9/1982 | Kurtz | 264/564 |
| 4,415,711 | 11/1983 | Jones | 425/72 R |
| 4,444,828 | 4/1984 | Anthony et al. | 264/171 |
| 4,456,660 | 6/1984 | Colombo | 264/171 |
| 4,511,609 | 4/1985 | Craver et al. | 264/171 |
| 4,552,712 | 11/1985 | Ramamurthy | 264/211 |
| 4,554,120 | 11/1985 | Ramamurthy | 264/211 |

FOREIGN PATENT DOCUMENTS

| | | |
|---|---|---|
| 544975 | 8/1956 | Belgium . |
| 1504458 | 10/1969 | Fed. Rep. of Germany . |
| 55-97928 | 7/1980 | Japan .............................. 264/176.1 |
| 59-91031 | 5/1984 | Japan .................................... 264/564 |
| 1235062 | 6/1971 | United Kingdom . |
| 1276023 | 6/1972 | United Kingdom . |

OTHER PUBLICATIONS

*Plastics World,* "Long-Stalk Extrusion", Jun. 1982, pp. 62–64.
Plastics and Rubber Int'l, vol. 11, No. 2, Apr. 1986, "VLDPE—A New Class of Polyethylene", p. 58.
Modern Plastics International, Oct. 1984, "Can 'VLDPE' Outperform EVA, Other Copolymers?", pp. 6–8.
Plastics World, Oct. 1984, "Ultralow Density PES Are Tough Flexible Versatile".
Plastics World, Oct. 1984, "UC Researchers Smash 0.915 PE Density Mark", pp. 8–9.

*Primary Examiner*—Jeffery Thurlow
*Attorney, Agent, or Firm*—Cushman, Darby & Cushman

[57] ABSTRACT

Blown film on the basis of polyethylene with a density below 910 kg/m$^3$ is prepared by extruding the molten polymer having a melt index of at least 2 dg/min at temperatures of the melt at the die gap of at most 160° C., the die gap width being at least 2 mm, blowing the molten polymer to a balloon, cooling, flattening and rolling it up. Films that have been prepared this way have improved mechanical and optical properties and are highly oriented.

1 Claim, No Drawings

PROCESS FOR THE PREPARATION OF BLOWN FILM

The invention relates to a process for the preparation of blown film from a polymer composition on the basis of polyethylene, in which the polymer composition is passed, in molten condition, via an extruder through an annular die and is blown up to form a balloon by means of a gas, supplied via an opening within the annular die, after which the polymer composition that has formed the balloon is cooled, flattened and wound up.

Such a process for the preparation of the blown film is known in itself and is described in, for instance, 'Petrothene Polyolefins . . . a processing guide' (a publication by the National Distillers and Chemical Corporation, 1971, 4th ed.).

Blown film from low-density polyethylene has found large-scale application as packing material. The major requirements to be met by packaging material are in the field of the mechanical properties such as stiffness, tear resistance, tensile strength, puncture resistance, and the like.

Depending on the application, often also requirements in the field of the optical properties, such as low transparency, low opacity and high gloss values, are to be met.

Film that is to be processed to refuse bags, for instance, will need to have good puncture resistance and tear properties, while carrier bag film must, in addition, have high stiffness. For bread packaging applications, especially stiffness and opticals play a role.

From 'Petrothene Polyolefins . . . a processing guide' it is known that the best optical properties are obtained when the polymer melt is processed at the highest possible temperatures. A temperature of the melt of 205° C. is not exceptional.

One of the factors determining the mechanical properties is the degree of orientation of the melt.

A recent development in the field of blown film preparation from low-density polyethylene is the so-called long-stalk extrusion. In this process, described in Plastics World, June 1982, pp. 62–64, an LDPE having a low melt index is started from, which is processed at a temperature of 190° C. at a slot width of about 1.1 m with an extra high frost line. The height of the frost line is the distance between the annular die and the frost line.

The main difference between this 'long stalk' extrusion and conventional extrusion is in the degree of melt orientation balance. This has as a consequence that blown film preparation by the long stalk process has a better impact strength than conventional blown film. A disadvantage, however, is that the stiffness and tear strength, especially in machine direction, deteriorate substantially. In addition, it is not possible to process linear low-density polyethylene into film in this way.

Interest in so-called linear low-density polyethylene, i.e. copolymer of ethylene and one or more $C_{3-18}$ 1-alkenes, has been increasing strongly since some time. There has especially been interest in LLDPE of ultra-low density, lower than 910 kg/m$^3$, since recently. This ultralow density polyethylene can be prepared by e.g. the process described in GB Pat. No. 1,235,062.

A method for processing into blown film of linear low-density polyethylene is described in European patent application No. 51358. This method uses die gaps of 0.4–5 mm. However, this method relates only to an ethylene-hydrocarbon copolymer having a density of higher than 910 kg/m$^3$. The temperature of the melt is about 162°–260° C.

The object of the present invention is to provide a process for the preparation of blown film from a polymer composition on the basis of polyethylene that is suitable for polyethylene having a density of lower than 910 kg/m$^3$ and that yields a film having good mechanical properties, notably high stiffness, and good tear properties and also good optical properties.

This object is achieved by processing the molten polymer composition at a temperature of the melt at the location of the die gap of at most 160° C., the die gap being at least 1 mm.

When processing is carried out under conditions according to the invention, special orientation effects surprisingly manifest themselves, imparting good mechanical properties to the film, such as good tear strength, high stiffness, etc. This effect is enhanced at temperatures of the melt at the location of the die gap of below 150° C., so that processing at below 150° C. is to be preferred, and in particular below 140° C.

The invention also relates to such oriented films. The degree and direction of orientation of films can be determined by X-ray diffraction analysis. This method yields information on the orientation of the crystalline fraction of the film. In non-oriented film, the X-rays are scattered uniformly in all directions. In oriented film, the scatter intensity depends on the direction, resulting in intensity fluctuations. The orientation effects are expressed by the ratio between intensity maximum and intensity minimum (I max/min) and the angle between the average molecule direction and the direction of extrusion ($\alpha$). These are determined by X-ray diffraction analysis. For oriented films prepared according to the invention, $I(max/min) \geq 20$ and $\alpha \leq 15°$, in particular $I(max/min) \geq 50$.

Polymer compositions that are suitable for processing into blown film according to the invention preferably have a density of higher than 880 kg/m$^3$ and are, for instance, copolymers of ethylene with one or more $C_3$–$C_{18}$ 1-alkenes as comonomer, but also mixtures of polyethylene homo- and/or copolymers having a density of higher than 910 kg/m$^3$ or mixture with, for instance, high-density polyethylene (density higher than 940 kg/m$^3$) and/or polypropylene can be applied with good results. The mixtures with low-density polyethylene homopolymers, high-density polyethylene and/or polypropylene preferably contain at least 50 wt.%, relative to the total polymer, of the polyethylene having a density of lower than 910 kg/m$^3$, and in particular at least 70%. For preparation of film having good optical properties, it is to be recommended to make use of a blend of ultra-low density polyethylene and ethylene homopolymer having a density of 910–940 kg/m$^3$.

Various additives, such as stabilizers, lubricants, fillers, colourants, waxes, means to combat melt fracture (fluorocarbonelastomers) and the like may also be present. Usually the amount by weight of additives will not amount to more than 20% of the amount by weight of polymer, preferably not more than 10%.

The melt index of these polymer compositions, determined according to ASTM D 1238, can have the usual values, for instance between 0.3 and 100 dg/min. In view of the low processing temperature, however, it is to be recommended to choose the melt index not lower than 1 dg/min. The favourable effect on the mechanical properties of the low-temperature processing in combination with the large die gap deteriorates at a melt index of higher than 75 dg/min and is most pronouncec at a melt index of at most 50 dg/min.

The advantage of the invention is that also polymer compositions having a relatively high melt index can be processed into blown film having good mechanical properties.

Another advantage is that highly oriented films are obtained without extension of equipment being necessary.

There is already advantage in applying the invention at die gaps of 1 mm, but larger die gaps, for instance of 5 or 10 mm, can also be applied, variations in die geometry also being possible. It has now been found that the mechanical properties of the film improve when a die gap of at least 2 mm and at most 5 mm is used, in particular of at least 3 mm.

In combination with the low processing temperature these larger die gaps result in even better mechanical properties, notably in good stiffness and tear properties.

In blown film extrusion the polymer composition exits the annular die in molten condition and is subsequently blown up. The balloon thus formed is cooled by bringing it into contact with relatively cold air or water. By adjustment of this cooling, influence can be exerted on the distance the polymer melt traverses outside the annular die before soldifying. The location of this transition is also called the frost line. The distance between the die and the frost line is referred to as the frost line height. In some cases the frost line is visible as a circular zone around the balloon, in other cases the frost line is not visible. In the latter cases the frost line can also be defined as the place at which the balloon reaches its final diameter.

In a process according to the invention the frost line preferably is low.

The balloon diameter divided by the annular die diameter is called the blow-up ratio. Its value may vary from 1 to 6, but generally is 1.5 to 4. These values can also be applied with good results in the process according to the invention.

Film for packaging purposes often must not only meet requirements relating to the mechanical properties, but also requirements as regards the optical properties. The optical properties of the film are improved when a polymer composition having a melt index of at least 2 dg/min, in particular at least 4 dg/min, is started from.

The process according to the invention is suitable especially for the preparation of single-layer film, but can also be applied for multilayer film.

The invention will now be elucidated by some examples. It is illustrated that the invention leads to films with improved stiffness (reflected by a high modulus of elasticity) and tear resistance, and also to improved optical properties.

EXAMPLES AND COMPARATIVE EXAMPLES 1 TO 9

Blown film was prepared under conditions as shown in the table. The used polymer compositions were:

A. Copolymer of ethylene and octene-1 with a density of 903 kg/m$^3$ and a melt index of 3 dg/min.

B. The polymer of A blended with 35% by weight of the total polymer composition of ethylene homopolymer with a density of 923 kg/m$^3$ and a melt index of 4 dg/min.

C. The polymer of A blended with 40% by weight of the total polymer composition of ethylene homopolymer with a density of 921 kg/m$^3$ and a melt index of 16 dg/min.

Use was made of a Troester extrusion equipment with a screw diameter of 60 mm and a length/diameter ratio of 25:1. The diameter of the annular die was 10 cm.

The temperature of the melt at the die gap was determined by means of a thermocouple. Of the film, the following properties were determined:

modulus of elasticity according to ASTM D 1922;

yield strength and tensile strength according to ISO R 527;

puncture resistance, determined from the energy required to puncture the film with a plunger at a rate of 50 mm/min;

notched tear resistance according to a method derived from DIN 53363, but with the notch at the centre of the film, at a drawing rate of 2.5 cm/min;

gloss according to ASTM D 523;

opacity according to ASTM D 1003;

transparency according to the Electro Evans Ltd. method.

The X-ray diffraction measurement was performed using CuKα radiation (50 kV, 35 mA, Ni-filter) and a Station camera. Parallel film radiation was employed. The sample-photograph distance was 5 cm. Densitometry of the photograph was carried out along the diameters of the circular bands for the directions M and α. For one densitometer scan the changes in the intensity are recorded as a function of the diffraction angle of the X-ray beam. For densitometrical purposes use was made of an Enraf Nonius microdensitometer, model 1, and the method described in C. G. Vonk & A. P. Pijpers, J. Appl. Cryst., 14, 8, (1981). A correction was applied for amorphous background radiation. The same method was used in European patent application No. 156130.

TABLE

|  | comp. ex. 1 | ex. 2 | comp. ex. 3 | comp. ex. 4 | comp. ex. 5 | ex. 6 | ex. 7 | ex. 8 | ex. 9 |
| --- | --- | --- | --- | --- | --- | --- | --- | --- | --- |
| Polymer composition | A | A | B | B | B | B | B | B | C |
| temperature of melt, °C. | 183 | 148 | 183 | 183 | 183 | 147 | 147 | 147 | 146 |
| die gap, mm | 3 | 3 | 3 | 3 | 3 | 3 | 3 | 3 | 3 |
| frost line height, cm | 30 | 30 | 30 | 30 | 30 | 30 | 30 | 30 | 30 |
| blow-up ratio | 2.5 | 2.5 | 2.5 | 2.5 | 2.5 | 2.5 | 2.5 | 2.5 | 2.5 |
| film thickness, μm | 10 | 10 | 20 | 15 | 10 | 20 | 15 | 10 | 15 |
| output, kg/hr | 27 | 27 | 27 | 27 | 27 | 27 | 27 | 27 | 36 |
| modulus of elasticity, N/mm$^2$ |  |  |  |  |  |  |  |  |  |
| ‖ | 61 | 93 | 160 | 186 | 211 | 215 | 248 | 294 | 144 |
| ⊥ | 76 | 108 | 118 | 138 | 134 | 138 | 157 | 117 | 143 |
| yield strength, N/mm$^2$ |  |  |  |  |  |  |  |  |  |
| ‖ | — | — | — | — | n.m.[1] | — | — | — | — |
| ⊥ | 4.5 | 5 | 7 | 9 | n.m.[1] | 8 | 9 | 8.5 | 7.5 |

TABLE-continued

|  | comp. ex. 1 | ex. 2 | comp. ex. 3 | comp. ex. 4 | comp. ex. 5 | ex. 6 | ex. 7 | ex. 8 | ex. 9 |
| --- | --- | --- | --- | --- | --- | --- | --- | --- | --- |
| Σ 25, N/mm² | | | | | | | | | |
| ‖ | 14 | 20.5 | 19 | 23.5 | n.m.[1] | 20 | 28.5 | 33.5 | 25 |
| ⊥ | 4 | 5 | 6.5 | 8 | n.m.[1] | 7 | 7.5 | 8 | 6.5 |
| puncture resistance, J/m | 3450 | 4242 | 1560 | 2478 | 3027 | 1595 | 1765 | 2564 | 1501 |
| notched tear resistance, kJ/m² | | | | | | | | | |
| ‖ | 670 | 958 | 693 | 775 | n.m.[1] | 798 | 848 | 1162 | 1022 |
| ⊥ | 103 | 197 | 89 | 90 | n.m.[1] | 89 | 81 | 90 | 65 |
| tensile strength, N/mm² | | | | | | | | | |
| ‖ | 43.5 | 38 | 30.5 | 34.5 | n.m.[1] | 37.5 | 43 | 33.5 | 32 |
| ⊥ | 24.5 | 23 | 30 | 33 | n.m.[1] | 30 | 30.5 | 26 | 23 |
| gloss, ‰ | 11 | 23 | 55 | 55 | 48 | 56 | 54 | 51 | 82 |
| opacity, % | 36 | 21 | 7.5 | 8.1 | 10.5 | 8.8 | 9.8 | 12.6 | 3 |
| transparency, EEL | n.r.d.[2] | n.r.d.[2] | 5 | 9 | 14 | 9 | 12 | 12 | 5 |
| I max/min | 15 | 26 | ∞ | ∞ | n.m.[1] | ∞ | ∞ | n.m.[1] | ∞ |
| α, degrees | 0 | 0 | 17 | 16 | n.m.[1] | 0 | 0 | n.m.[1] | 12 |

Notes:
[1] not measured.
[2] owing to the high opacity, the value for transparency cannot be determined in a reliable way.
[3] α can only be determined in a reliable way if the intensity ratio $\frac{max.}{min.} \geq 10$.
[4] Intensity ratios $\frac{max.}{min.}$ 100 are represented as ∞. This is due to the small value of the minimum intensity.

I claim:

1. Process for the preparation of highly oriented blown film from a polymer feed composition comprising the steps of:
   (a) melting an ethylene polymer feed composition having a density of less than 910 kg/m³ or a blend of at least 50 wt%, relative to the total polymer, of polyethylene having a density of less than 910 kg/m³ with a member of the group consisting of:
      (i) low density polyethylene having a density of 910–940 kg/m³;
      (ii) high density polyethylene having a density of higher than 940 kg/m³;
      (iii) polypropylene; and
      (iv) mixtures thereof
   wherein said polymer feed composition has a melt index of at least 2 dg/min;
   (b) extruding the melt through an extruder having an annular die gap width of at least 2 mm, at a temperature of the melt at the die of at most 160° C. to form an extruded tube;
   (c) supplying a gas via an opening within said annular die to inflate said extruded tube to form an expanded balloon;
   (d) thereafter cooling said balloon with cold air or water to solidify the polymer; and
   (e) flattening and winding up the resulting film, wherein said film exhibits an X-ray diffraction intensity ratio I max/min of at least 20, and an angle α of at most 15° between the average direction of orientation of the polymer molecule and the direction of film extrusion.

2. Process of claim 1 wherein said melt temperature is at most 150° C.

3. Process of claim 2 wherein said melt temperature is at most 140° C.

4. Process of claim 1 wherein said feed composition has a melt index of from 1 to 100 dg/min.

5. Process of claim 4 wherein said feed composition has a melt index of from 2 to 75 dg/min.

6. Process of claim 5 wherein said feed composition has a melt index of from 4 to 50 dg/min.

7. Process of claim 1 wherein said annular die gap width is from 2 mm to 5 mm.

8. Process of claim 7 wherein said annular die gap width is at least 3 mm.

9. Process of claim 1 wherein a single layer film is produced.

10. Process of claim 1 wherein said feed composition is a copolymer of ethylene with one or more 3–18 carbon atom 1-alkene comonomers.

11. Process of claim 10 wherein said feed composition is a copolymer of ethylene with one or more 6–12 carbon atom 1-alkene comonomers.

12. Process of claim 1 wherein said ethylene polymer feed composition comprises a copolymer of ethylene and octene-1 with a density of 903 kg/m³ and a melt index of 3 dg/min.

13. Process of claim 1 wherein said ethylene polymer feed composition comprises a blend of (i) a copolymer of ethylene and octene-1 with a density of 903 kg/m³ and a melt index of 3 dg/min, with (ii) ethylene homopolymer with a density of 923 kg/m³ and a melt index of 4 dg/min, wherein said ethylene homopolymer is 35% by weight of the total blend.

14. Process of claim 1 wherein said ethylene polymer feed composition comprises a blend of (i) a copolymer of ethylene and octene-1 with a density of 903 kg/m³ and a melt index of 3 dg/min, with (ii) ethylene homopolymer with a density of 921 kg/m³ and a melt index of 16 dg/min, wherein said ethylene homopolymer is 40% by weight of the total blend.

* * * * *

UNITED STATES PATENT AND TRADEMARK OFFICE
CERTIFICATE OF CORRECTION

PATENT NO. : 4,820,471

DATED : April 11, 1989

INVENTOR(S) : VAN DER MOLEN

It is certified that error appears in the above-identified patent and that said Letters Patent is hereby corrected as shown below:

Column 3, line 2, please correct the spelling of "pronouncec" to read --pronounced--.

Column 4, line 40, please correct the spelling of "station" to read --statton--.

Signed and Sealed this

Eighth Day of May, 1990

*Attest:*

HARRY F. MANBECK, JR.

*Attesting Officer*     *Commissioner of Patents and Trademarks*